Patented Nov. 12, 1935

2,020,467

UNITED STATES PATENT OFFICE 2,020,467

PRODUCTION OF GLASS

Erich Heinz, Hamburg, Germany

No Drawing. Application February 8, 1933, Serial No. 655,766. In Germany February 11, 1932

5 Claims. (Cl. 106—36.1)

My invention relates to the art of glass making and more especially to means, whereby the quality of the glass is improved and its fusibility is enhanced without appreciably increasing the cost of production.

It is an object of my invention to provide a composition which when added to the frit improves the quality and the mode of production of the glass in these and other directions, which will appear more fully as this specification proceeds.

As is well known to those skilled in the art, the quality of an ordinary soda-lime-glass can be greatly improved by the addition of boric acid, which not only renders the glass more resistive against variations of temperature, but also improves the outer appearance of the articles made from this glass and more especially their gloss and the colorlessness, as far as colorless hollow glass is concerned. Apart therefrom, an addition of borax or boric acid to the batch renders the batch more readily fusible, whereby the time required for the melting down is shortened.

A high gloss is imparted to the glass also by an addition of barium oxide and it is a well known fact that if the barium oxide is incorporated into the glass for instance by adding barium carbonate, the fusibility of the frit is greatly increased.

Obviously, corresponding quantities of borax or barium carbonate must be added in order to obtain a full effect and it is equally obvious that the costs of production of the batch are thereby increased also, which is a serious consideration in the case of ordinary glass articles, which sell at a comparatively low price.

Apart therefrom the glass pots as well as the bricks constituting the tank furnaces are attacked by borax as well as by barium carbonate or by barium sulfate, which is also used for the introduction of barium oxide.

According to the present invention these drawbacks are obviated, contrary to all expectations, by adding these chemicals not singly, but under the form of a vitreous composition or flux obtained by melting them down, this flux being preferably added to the batch in powdered form. Thus boron trioxide and barium oxide are not added to the batch singly, but under the form of a barium-boro-silicate, which may contain in addition to silica, boron trioxide and barium oxide, also a certain percentage of alumina and an alkali. Preferably the vitreous composition contains from 35 to 50% silica, from 8 to 20% boron trioxide, from 15 to 30% barium oxide, from 3 to 7% alumina and from 8 to 12% of a suitable alkali.

A silicate of this kind is produced by mixing its constituents in a well known manner and melting the mixture down in a tank furnace at the lowest possible temperature, say at 1200° to 1260° C. The fluid composition is then allowed to flow into a tank filled with water, in order to granulate it and the granulated composition is then dried and ground to powder. Some selenium is preferably added to decolorize the silicate.

Since powdered glass, when added to the batch, is known to unfavorably influence the colorlessness and the clarification of the glass, an oxidant must be added to the ground silicate in order to convert any ferrous oxide into ferric oxide. I prefer adding for this purpose some saltpetre and arsenic. When these two compounds have been added, the silicate powder is ready for use and can be sold as such.

I may for instance mix 400 lbs. sand, 600 lbs. borax, 200 lbs. barium carbonate, 450 to 500 lbs. feldspar, and 40 to 60 lbs. calcined soda, adding thereto 10 to 12 grams metallic selenium. This mixture is fused at a temperature varying between 1200 and 1300° C., the fused mass is pulverized and added to the batch in suitable proportion and intimately admixed to the batch.

I may for instance add to an ordinary colorless hollow glass 2% of the vitreous composition, calculated on the weight of the sand present in the batch, which may contain 100 parts sand, 2 parts of the flux, 35 parts soda and 20 parts limestone.

By the addition of the flux above described the gloss and colorlessness of an ordinary colorless hollow glass is extraordinarily increased. An addition of not more than 50 parts flux per 1000 parts sand imparts to the finished glass, even if produced in continuously operated tank furnaces, a gloss of an intensity as can never be obtained by directly adding borax and barium carbonate, and nevertheless the price of the frit is lower than before.

The new flux does not attack the pots and bricks in any way, but on the contrary coats them with a glaze, which protects the bricks against the corrosive action of other fluxes. It is a well known fact that borax will corrode quite particularly the bricks of the furnace, even if present only in comparatively small quantities. If the borax is replaced by the barium boro-silicate, the life of the glass furnace is lengthened considerably.

The presence of the new composition further greatly shortens the time of melting down of the glass, the more so, the greater the quantity of barium boro-silicate added. When adding 200 kgs.

silicate per 1000 kgs. sand, the acceleration of the melting process or, in other words, the raising of the production of a continuous tank furnace, per unit of time, will amount to from 25 to 35%. I am thus for instance enabled to combine two or more tanks, thereby rendering the production more economical.

The barium boro-silicate is further adapted to replace potash with great advantage. In the first place, potash is used in the production of higher grade glasses, but also of certain colored glasses, such as the rose-colored glass prepared with the addition of selenium. In this latter case, potash is believed to be required for the obtention of the correct tint, but it has been found that glass produced with potash and colored with selenium will, when placed in the annealing oven, frequently undergo changes of color in correspondence with the variations of temperature in the annealing oven. This drawback can be obviated altogether by replacing the potash by the barium boro-silicate, which guarantees an absolutely uniform tint.

Apart from this important advantage, which is obtained only in the case of colored glass, the first costs of the frit are greatly reduced as compared with potash glass.

The barium boro-silicate can further serve also to partly replace the lead compounds, which may be used in the production of glass. In light weight lead glasses, which contain only a comparatively small percentage of lead, the whole of the lead may be replaced by the barium boro-silicate, thereby effecting an enormous saving in view of the high price of lead compounds. With the heaviest kind of lead glasses, only part of the lead compounds can be replaced by the double silicate.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. In the process of compounding glasses of the usual soda-lime type the step which comprises adding to the usual glass batch ingredients a prefused barium borosilicate flux having a composition which comprises about 8 to 20 per cent by weight boron trioxide and about 15 to 30 per cent by weight barium oxide and containing silica in proportions at least chemically equivalent to the boron trioxide and the barium oxide.

2. The process of claim 1 wherein the barium borosilicate flux contains silica in amounts ranging from about 35 to 50 per cent by weight.

3. The process of claim 1 wherein the prefused flux also contains from about 3 to 7 per cent by weight of aluminum oxide and from about 8 to 12 per cent by weight of alkali.

4. The process of claim 1 wherein the prefused flux also contains added decolorizing and oxidizing agents.

5. In the process of improving glasses of the usual soda-lime type the step which comprises adding to the usual glass batch ingredients a pre-fused barium borosilicate flux having a composition which comprises about 35 to 50 per cent by weight of silica, about 8 to 20 per cent by weight of boron trioxide, 15 to 30 per cent by weight of barium oxide together with added decolorizing and oxidizing agents.

ERICH HEINZ.